United States Patent
Teng et al.

(10) Patent No.: US 10,921,060 B2
(45) Date of Patent: Feb. 16, 2021

(54) FURNACE ASSEMBLY FOR A METAL-MAKING PROCESS

(71) Applicants: ABB Schweiz AG, Baden (CH); Tenova S.p.A., Milan (IT)

(72) Inventors: Lidong Teng, Västerås (SE); Anders Lehman, Bromma (SE); Hongliang Yang, Västerås (SE); Andrea Grasselli, Seregno (IT); Maria Silvio Reali, Milan (IT)

(73) Assignees: ABB Schweiz AG, Baden (CH); Tenova S.p.A., Milan (IT)

(*) Notice: Subject to any disclaimer, the term of this patent is extended or adjusted under 35 U.S.C. 154(b) by 0 days.

(21) Appl. No.: 16/482,033

(22) PCT Filed: Feb. 10, 2017

(86) PCT No.: PCT/EP2017/052941
§ 371 (c)(1),
(2) Date: Jul. 30, 2019

(87) PCT Pub. No.: WO2018/145754
PCT Pub. Date: Aug. 16, 2018

(65) Prior Publication Data
US 2019/0390908 A1    Dec. 26, 2019

(51) Int. Cl.
*F27B 3/08* (2006.01)
*F27B 3/18* (2006.01)
*F27B 3/28* (2006.01)
*F27D 27/00* (2010.01)
*F27D 3/16* (2006.01)
*F27D 19/00* (2006.01)

(52) U.S. Cl.
CPC ............... *F27B 3/085* (2013.01); *F27B 3/18* (2013.01); *F27B 3/28* (2013.01); *F27D 27/00* (2013.01); *F27D 2003/167* (2013.01); *F27D 2019/0006* (2013.01)

(58) Field of Classification Search
CPC ............... F27B 3/085; F27B 3/18; F27B 3/28
USPC ................. 75/10.65, 382, 508, 685; 219/749
See application file for complete search history.

(56) References Cited

U.S. PATENT DOCUMENTS

| | | | |
|---|---|---|---|
| 1,300,434 A | 4/1919 | McGregor | |
| 3,406,240 A | 10/1968 | Sixel | |

(Continued)

FOREIGN PATENT DOCUMENTS

| | | |
|---|---|---|
| CN | 101876024 A | 11/2010 |
| CN | 102349124 A | 2/2012 |

(Continued)

OTHER PUBLICATIONS

Korean Office Action and Translation Application No. 10 2019 7024084 dated Oct. 23, 2019 11 pages.

(Continued)

*Primary Examiner* — Thien S Tran
(74) *Attorney, Agent, or Firm* — Whitmyer IP Group LLC

(57) ABSTRACT

A furnace assembly for a metal-making process, including: an electric arc furnace configured for flat bath operation and having a bottom, and an electromagnetic stirrer configured to be arranged underneath the bottom of the electric arc furnace to enable stirring of molten metal in the electric arc furnace.

19 Claims, 2 Drawing Sheets

(56) References Cited

U.S. PATENT DOCUMENTS

| | | | |
|---|---|---|---|
| 4,470,846 A * | 9/1984 | Dub/e/ | C22B 21/062 266/235 |
| 4,862,477 A | 8/1989 | Olds et al. | |
| 5,346,528 A * | 9/1994 | Takashima | C21B 13/12 266/215 |
| 5,936,966 A * | 8/1999 | Ogawa | H04L 29/06 370/394 |
| 5,948,138 A | 9/1999 | Issidorov | |
| 9,045,810 B2 | 6/2015 | Bel Fdhila et al. | |
| 2009/0020925 A1 | 1/2009 | Takahashi | |
| 2009/0031854 A1 | 2/2009 | Argenta et al. | |
| 2009/0322000 A1 | 12/2009 | Takahashi | |
| 2013/0211581 A1 | 8/2013 | Assante et al. | |
| 2014/0175715 A1 * | 6/2014 | Eriksson | B22D 41/08 266/45 |
| 2014/0305261 A1 | 10/2014 | Lundh et al. | |
| 2014/0318314 A1 | 10/2014 | Bel Fdhila et al. | |
| 2017/0227290 A1 | 8/2017 | Zhang et al. | |

FOREIGN PATENT DOCUMENTS

| | | | | |
|---|---|---|---|---|
| CN | 103797323 A | | 5/2014 | |
| CN | 104109732 A | | 10/2014 | |
| CN | 104707960 A | | 6/2015 | |
| DE | 2362089 A1 | | 6/1975 | |
| EP | 0228024 A2 | | 7/1987 | |
| EP | 2751510 A1 | | 7/2014 | |
| EP | 2751510 B1 | | 7/2014 | |
| EP | 2792755 A1 | | 10/2014 | |
| JP | 62041577 A | | 2/1987 | |
| JP | S6273591 | * | 4/1987 | |
| JP | S6273591 A | | 4/1987 | |
| JP | H0254711 A | | 2/1990 | |
| JP | 05-332679 A | * | 12/1993 | |
| JP | 05332679 | | 12/1993 | |
| JP | 06050666 A | | 2/1994 | |
| JP | 09-061065 A | * | 3/1997 | |
| JP | 09061065 | | 3/1997 | |
| JP | H0961065 A | | 3/1997 | |
| JP | 2004251530 A | | 9/2004 | |
| JP | 2014519551 A | | 8/2014 | |
| JP | 22014210972 A | | 11/2014 | |
| KR | 20140054403 A | | 5/2014 | |
| KR | 20160115935 A | | 10/2016 | |
| RU | 124956 U1 | | 2/2013 | |
| RU | 126810 U1 | | 4/2013 | |
| RU | 2014107814 A | | 10/2015 | |
| WO | 9848060 A1 | | 10/1998 | |
| WO | 2010099640 A1 | | 9/2010 | |
| WO | 2012145967 A1 | | 11/2012 | |
| WO | 2013010575 A1 | | 2/2013 | |
| WO | WO-2015122086 A1 | * | 8/2015 | F27B 3/19 |
| WO | 2015192866 A1 | | 12/2015 | |
| WO | 2016131949 A1 | | 8/2016 | |

OTHER PUBLICATIONS

Chinese Office Action Application No. 2017800748207 Completed on: Oct. 10, 2019 3 pages.
International Preliminary Report on Patentability Application No. PCT/EP2017/052941 Completed: Jan. 4, 2019; dated Jan. 4, 2019 14 pages.
International Search Report and Written Opinion of the International Searching Authority Application No. PCT/EP2017/052941 Completed: Sep. 13, 2017; dated Sep. 21, 2017 15 pages.
European Third Party Observation Application No. 17704737 Mailing Date: Aug. 26, 2019 12 pages.
Japanese Office Action with Translation Application No. 2019-543351 dated Apr. 22, 2020 12 pages.
Chinese Office Action, Search Report and Translation Application No. 2017800861623 completed: Feb. 7, 2020 14 Pages.
Russian Decision on Grant Search Report and Translation Application No. 2019127045/02(053005) Completed: Mar. 13, 2020 9 Pages.
Chinese 2nd Office Action with Translation Application No. 2017800861623 dated Jun. 5, 2020 8 pages.
Korean Office Action with Translation Application No. 10-2019-7024084 dated Jul. 20, 2020 7 pages.
Japanese Office Action and Translation; Application No. 2019-543351; dated Oct. 20, 2020; 13 Pages.
Korean Office Action and Translation; Application No. 10-2019-7024084; dated Nov. 6, 2020; 6 Pages.

* cited by examiner

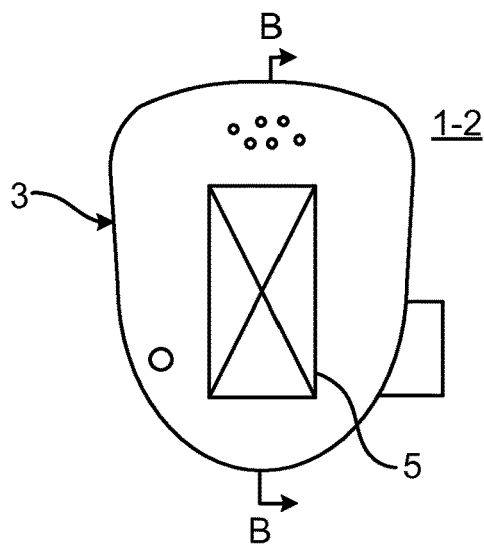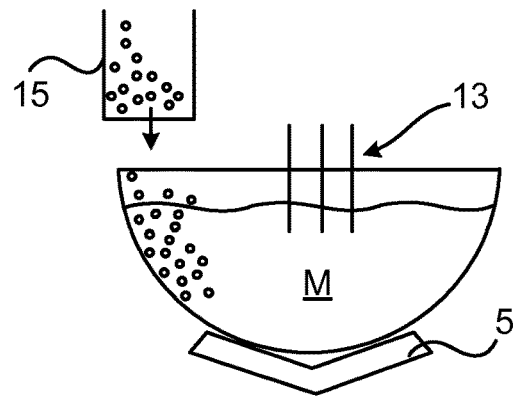
Fig. 3a                Fig. 3b
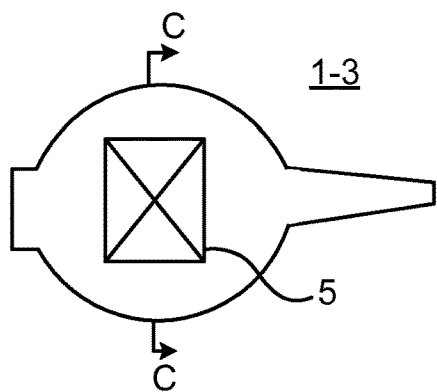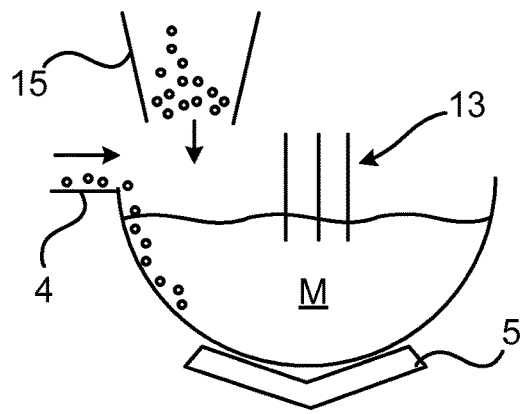
Fig. 4a                Fig. 4b
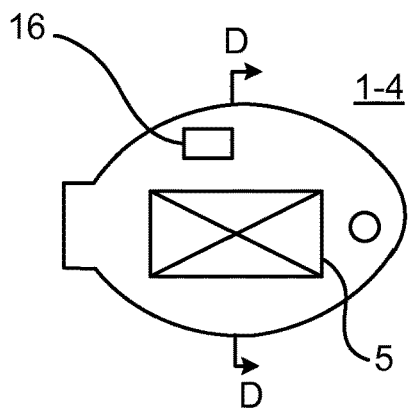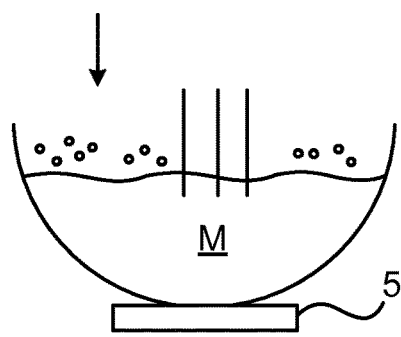
Fig. 5a                Fig. 5b

FURNACE ASSEMBLY FOR A METAL-MAKING PROCESS

TECHNICAL FIELD

The present disclosure generally relates to metal-making and in particular to a furnace assembly for a metal-making process.

BACKGROUND

Flat bath operation (FBO) is a process of continuously feeding or small-bucket charging of metallic materials such as scrap, pig iron, direct reduced iron (DRI), hot metal, or hot briquetted iron (HBI), into the furnace bath of an electric arc furnace (EAF) without opening the furnace roof. During the metallic charging, the electric arc is continuously powered and the metallic materials are continuously melted in the bath. This process provides high energy efficiency and less electrode consumption.

One issue of a flat bath melting process is the temperature homogenization of the furnace bath, especially in the metal charging area which is always a cold zone. Incomplete metal-melting in the cold zone creates potential problems such as concentration gradients, unreliable measurements, unsafe process control, superheated bath, and over tap temperature. To solve this inhomogeneous temperature problem, bath stirring is recommended to improve the melt convection. To this end, bottom gas stirring by porous plugs has been implemented in the some of these furnaces.

For bottom gas stirring, porous plugs with direct or indirect gas purging are installed in the bottom refractory. Normally 3-5 porous plugs are needed depending on the furnace size. The stirring intensity is controlled by the gas, typically nitrogen or argon, and by flow rate and pressure.

SUMMARY

There are some challenges with bottom gas stirring. For example, there may be incomplete bath mixing with dead zones far from the plugs, resulting in limited homogenization in the furnace bath. Furthermore, the stirring pattern and direction are fixed by the plug positions with limited horizontal flow velocity. Moreover, the refractory wearing around the porous plug is more serious and the plugs on the bottom are risk points for melt breakout. Finally, the lifespan of the porous plug is often shorter than that of the bottom lining campaign, and online maintenance for porous plugs is a difficult and complicated work.

In view of the above, an object of the present disclosure is to provide a furnace assembly for a metal-making process which solves, or at least mitigates, the problems of the prior art.

There is hence provided a furnace assembly for a metal-making process, comprising: an electric arc furnace configured for flat bath operation and having a bottom, and an electromagnetic stirrer configured to be arranged underneath the bottom of the electric arc furnace to enable stirring of molten metal in the electric arc furnace.

An effect which may be obtainable thereby is that stirring within the entire melt bath with no dead zone or essentially no dead zone in the bath may be provided. Hence, more efficient metal-making using an electric arc furnace configured for flat bath operation may be provided.

Moreover, there is no negative effect on the refractory lining and no molten metal breakout risk, as is the case with porous plugs. Additionally, the long lifespan of the electromagnetic stirrer coil requires almost no maintenance.

The electromagnetic stirring reduces the melt surface superheat and the heat from the arc zone is quickly transmitted to the bulk melt. The decrease of surface superheat temperature reduces the heat losses to the furnace wall and roof during the power on period, which thereby reduces the electricity consumption. Another advantage of superheat reduction during power on is less refractory wearing in the slag-line area of the electric arc furnace.

A further effect provided by the electromagnetic stirrer on the electric arc furnace with flat bath operation process is that the process reliability is significantly improved. The fast melt-down of e.g. scrap and ferrochromium provides a quick homogenization of the melt bath on both chemical composition and temperature, which ensures the targeted steel tapping weight and temperature. Homogeneous temperature in the whole bath provides a smooth tapping and reduces tapping delays. The elimination of thermal stratification in the melt bath also reduces the tapping temperature. High eccentric bottom tapping free opening frequency is a very important benefit both for the operation safety and productivity.

According to one embodiment the electric arc furnace has a metal-charging region, wherein the electromagnetic stirrer is configured to be arranged to provide stirring of molten metal in the metal-charging region.

The metal-charging region is a region of the interior of the electric arc furnace, which receives the charged metallic material. It includes a portion of the bottom of the electric arc furnace where the metallic material fed to the electric arc furnace is initially accumulated before being melted by the heat in the electric arc furnace and mixed with the rest of the melt by stirring of the electromagnetic stirrer.

According to one embodiment the metal-charging region is located off-center with respect to a center point of the bottom of the electric arc furnace.

According to one embodiment the electromagnetic stirrer comprises coils configured to generate a traveling magnetic field in a first direction along a stirring direction axis, wherein the electromagnetic stirrer is configured to be arranged so relative to a central plane extending through the center of the electric arc furnace and through a tapping hole or spout of the electric arc furnace that the stirring direction axis is at an angle relative to the central plane.

The first direction, which defines the stirring direction axis along a stirring direction of molten metal in the electric arc furnace, hence intersects the central plane. The central plane is a vertical plane when the arc furnace is in operation, i.e. when in a tap-to-tap melting cycle.

In this manner, the stirring force will be directed directly towards the metal-charging region, and thus more efficient stirring in the always cold metal-charging region or area may be obtained. Cold here means cooler than the rest of the melt.

According to one embodiment the angle is in the range of 0° and 90°.

According to one embodiment the angle is 90°.

According to one embodiment the angle is greater than 0° and less than 90°.

The stirring force created by the electromagnetic stirrer will thereby be directed towards the metal-charging region cold scrap zone area with a selectable angle in the range of 0 to 90 degrees. This electromagnetic stirrer configuration will create a melt flow towards or backwards the cold metal-charging region or zone in the furnace which greatly improves the metal-melting and furnace temperature homogenization.

According to one embodiment the electromagnetic stirrer is arranged centered underneath the electric arc furnace.

According to one embodiment the electromagnetic stirrer is arranged off-center underneath the electric arc furnace.

One embodiment comprises an electromagnetic stirrer position controller configured to control the orientation of the electromagnetic stirrer relative to the electric arc furnace to thereby adjust the angle.

By being able to change the stirring direction more flexible control may be provided. For example, by orienting the electromagnetic stirrer with a certain angle relative to the central plane sufficient global stirring of the melt may be provided, i.e. also in the metal-charging region, while the stirring may reduce vortex formation above the tapping hole, in the manner disclosed in EP2751510.

One embodiment comprises a frequency converter configured to control the current in the electromagnetic stirrer, and a control system configured to control the frequency converter.

According to one embodiment the electric arc furnace is configured to receive charging of metallic material from a side of the electric arc furnace.

According to one embodiment the electric arc furnace is configured to receive charging of metallic material from above the electric arc furnace.

According to one embodiment the electric arc furnace is configured to receive continuous charging of the metallic material.

The electric arc furnace may for example be configured to receive continuous charging of the metallic material by means of a conveyor belt or a runner. Alternatively, or additionally, the electric arc furnace may be configured to receive continuous charging of the metallic material from a hole in the roof of the electric arc furnace. Hereto, the roof, or furnace roof, may be provided with a through-opening or hole to allow for top feeding of metallic material into the electric arc furnace.

According to one embodiment the electric arc furnace is configured to receive bucket charging of the metallic material through a shaft.

Generally, all terms used in the claims are to be interpreted according to their ordinary meaning in the technical field, unless explicitly defined otherwise herein. All references to a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIGS. 2a-2b, 3a-3b, 4a-4b, and 5a-5b schematically show various example of furnace assemblies in a partially transparent top view and in cross section.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a furnace assembly for a metal-making process. The metal-making process may for example be a steel-making process, an aluminum-making process, or lead-making process.

The furnace assembly comprises an electric arc furnace and an electromagnetic stirrer configured to be arranged underneath the electric arc furnace to thereby enable stirring of molten metal in the electric arc furnace. The electromagnetic stirrer may for example be configured to be mounted onto the electric arc furnace rockers and configured to be rotated together with an electric arc furnace tilting system, or the electromagnetic stirrer may for example be configured to be mounted underneath the electric arc furnace on a separate support structure, for example on a trolley, which is configured to be stationary or to rotate synchronously with the bottom of the electric arc furnace upon a tapping operation.

The herein presented electric arc furnace is configured for flat bath operation. Hereto, the electric arc furnace is configured to receive metal in a continuous manner during a tap-to-tap cycle. To this end, the electric arc furnace is configured to be charged continuously with metal during a tap-to-tap cycle. The charging assembly and the electric arc furnace may for example be configured for a Consteel®, Quantum®, or an EcoArc® procedure/assembly, or for continuous DRI feeding from the roof of the electric arc furnace. The electric arc furnace may hence for example be configured to be charged with metallic material from the side of the electric arc furnace, in which case the electric arc furnace may be configured as a shaft furnace. Or the electric arc furnace may be configured to be charged with metallic material from the roof. The metallic material may either be pre-heated, hot or cold.

Figure 1:
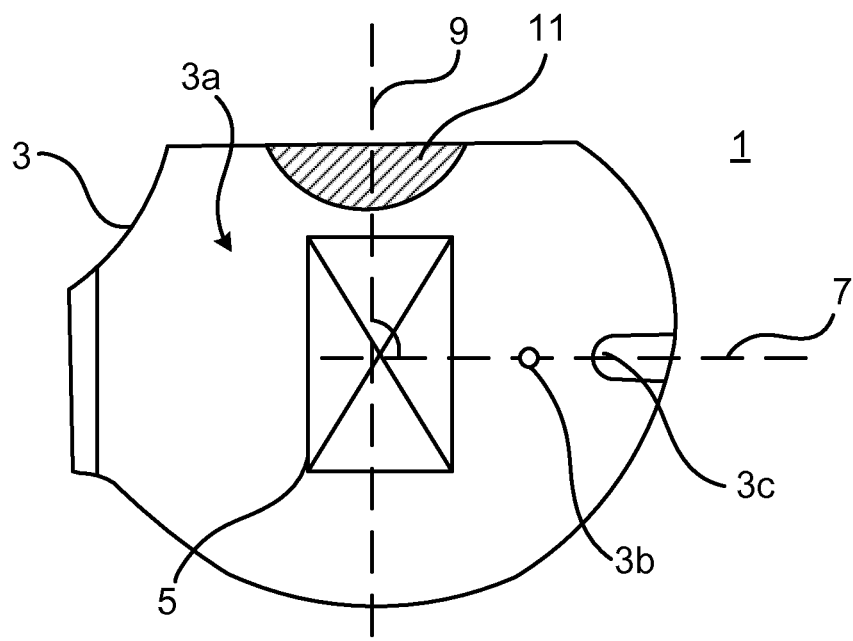
FIG. 1 schematically shows a partly transparent top view of an electric arc furnace, and an electromagnetic stirrer provided below the electric arc furnace.

FIG. 1 schematically shows a partially transparent top view of an example of a furnace assembly 1 for metal-making. The furnace assembly 1 comprises an electric arc furnace 3 having a body or furnace shell configured to receive and hold metallic material during a tap-to-tap cycle.

The body or furnace shell is furthermore configured to receive a plurality of electrodes arranged to be lowered into the body or furnace shell to melt any metallic material contained therein.

The electric arc furnace 3 comprises a bottom 3a having a tapping hole 3b, or alternatively or additionally a spout 3c, in order to enable tapping of the heat of metal from the body or furnace shell. In case of a variation which includes a tapping hole 3b, the tapping hole 3b is arranged offset, or off-center, relative to the center point of the bottom 3a of the furnace shell.

The furnace assembly 1 furthermore comprises an electromagnetic stirrer 5. The bottom 3a of the electric arc furnace 3 comprises a non-magnetic window, beneath which the electromagnetic stirrer 5 is configured to be installed. The non-magnetic window may for example comprise austenitic stainless steel, or any other kind of non-magnetic metallic material.

The electromagnetic stirrer 5 comprises a magnetic core and coils arranged around the magnetic core, not shown. The coils may be configured to be connected to a respective electric phase of an AC current supply so that the electromagnetic stirrer 5 can be fed with a poly-phase low frequency AC current. The coils are thus configured such that when suitably fed with a respective AC current, a traveling magnetic field is generated along a stirring direction axis 9.

In operation, the low frequency AC current through the coils generates a traveling magnetic field which penetrates the electric arc furnace bottom and thereby generates forces in the molten metal or melt. Since the magnetic field penetrates the whole depth of the melt, the melt will flow in the same direction, along the stirring direction axis 9, across the entire diameter/width of the electric arc furnace and down to the whole depth of the bath. After reaching the electric arc furnace wall the melt will flow back along the sides of the electric arc furnace.

Furthermore, in FIG. 1, a central plane 7 is shown, extending through the center point of the bottom 3a and through the center of the tapping hole 3b, or in case of a presence of a spout 3c, through the center of the spout 3c. This plane is typically a vertical plane when the furnace assembly 1 has been installed in a metal works or metal mill, for example a steel mill or an aluminum mill.

The electromagnetic stirrer 5 is configured so that there is an angle α between the central plane 7 and the stirring direction axis 9 which intersects the central plane 7. In the example shown in FIG. 1, the angle α is 90°.

According to one variation, the angle α between the central plane 7 and the stirring direction axis 9 may be in the range of 0° and 90°. For example, the angle α may be 0°, or the angle α may be more than 0° but less than 90°. In this latter case, the electromagnetic stirrer 5 would be inclined or arranged obliquely with respect to the central plane 7. The electromagnetic stirrer 5 may be arranged centered underneath the electric arc furnace with respect to the center of the electric arc furnace, or it may be arranged off-set from the center.

The orientation of the electromagnetic stirrer relative to the central plane 7 may be adjusted, either manually or in an automated manner. For example, the furnace assembly may comprise an electromagnetic stirrer position controller configured to control the orientation of the electromagnetic stirrer 5 relative to the electric arc furnace 3, and in particular relative to the central plane 7, to thereby adjust the angle α. The angle α may for example be adjusted or controlled based on the instantaneous amount of global stirring of the melt necessary and based on the need of vortex reduction above the tapping hole 3a, in the event that the electric arc furnace 3 has a tapping hole. The orientation of the electromagnetic stirrer 5 may thus be a trade-off between optimal global stirring and vortex reduction.

The electric arc furnace 3 also has a metal-charging region 11, which is a region of the bottom 3a of the body or furnace shell where the metallic material charged continuously into the furnace shell is initially accumulated in the electric arc furnace 3. The metal-charging region 11 may be arranged off-center with respect to center of the bottom 3a, as shown in the example in FIG. 1. Alternatively, the metal-charging region 11 may be arranged at the center or essentially at the center of the bottom 3a.

In case the electric arc furnace is configured to be charged with metallic material through a through-opening or hole in the furnace roof, the metal-charging region 11 will typically not be at bottom of the body or furnace shell, but on the surface or meniscus of the melt. In this case, the metal-charging region may be arranged center or off-centered in a horizontal section of the electric arc furnace.

The electromagnetic stirrer 5 is arranged so that the stirring force created by the electromagnetic stirrer 5 is directed towards the cold zone formed by the metal-charging region 11, or at an angle of up to 90° depending on the orientation of the electromagnetic stirrer 5 relative to the central plane 7. It is thereby possible to create a melt flow towards or backwards the metal-charging region 11 in the electric arc furnace 3, which greatly improves the metal-melting and temperature homogenization compared to the use of, or without use of, porous plugs in combination with gas. As previously noted, the electromagnetic stirrer 5 may be arranged centered underneath the electric arc furnace, or it may be arranged off-center. In the latter case, the electromagnetic stirrer may for example be arranged underneath the metal-charging area 11, with the angle α anywhere between 0° and 90° degrees relative to the central plane 7.

The furnace assembly may comprise a power converter, typically a frequency converter, not shown, configured to control the current in the coils of the electromagnetic stirrer, to thereby control the stirring of the molten metal or melt contained in the furnace shell. In this case, the furnace assembly may also comprise a control system configured to control the frequency converter to thereby control the current in the electromagnetic stirrer.

Various examples of a furnace assembly will now be shown with reference to FIGS. 2a-2b, 3a-3b, 4a-4b, and 5a-5b.

Figure 2A:
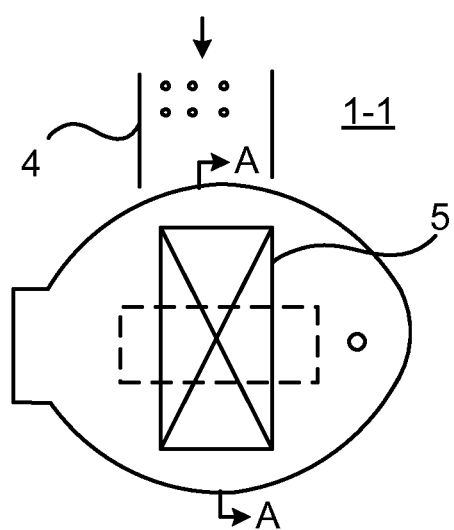

FIG. 2a shows a partially transparent bottom view of an example of a furnace assembly 1 with flat bath operation. The exemplified furnace assembly 1-1 is continuously fed with metallic material from the side of the furnace shell by means of a conveyor belt 4. The electromagnetic stirrer 5 is arranged below the bottom of the electric arc furnace 3. The electromagnetic stirrer 5 shown with solid lines is depicted with an angle α that is 90° relative to the central plane 7 shown in FIG. 1. The electromagnetic stirrer 5 is also shown with another orientation, with dashed lines, where the angle α is 0° relative to the central plane 7. The electromagnetic stirrer 5 may be configured to be oriented with any angle α between 0° and 90° or with essentially any angle α between 0° and 90°. For example, if the electromagnetic stirrer is motor-driven, not all angles may be possible to be attained and the actual orientation may be dependent upon the resolution provided by the electromagnetic stirrer position controller.

Figure 2B:
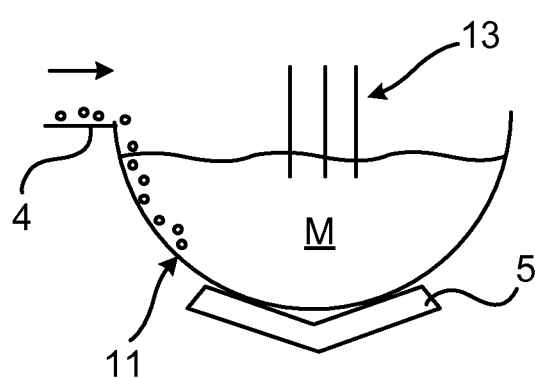

In FIG. 2b, a cross-sectional view of the furnace assembly 1-1 is shown, with the cross-section being taken at lines A-A in FIG. 2a. Here, the electrodes 13 which are submerged in the melt M are also shown, as well as the metal-charging region 11. According to this example, the metallic material may be charged continuously into furnace shell or body by means of a conveyor belt 4 moving from the side towards the electric arc furnace 3.

FIG. 3a shows a partially transparent top view of another example of a furnace assembly 1 with flat bath operation. The exemplified furnace assembly 1-2 is fed with metallic material from the top to e.g. an off-center location in the electric arc furnace 3, via a shaft 15 arranged above the electric arc furnace 3. The electromagnetic stirrer 5 may again be able to be oriented within 0° and 90° relative to the central plane 7 shown in FIG. 1. FIG. 3b shows the furnace assembly 1-2 through the cross-section taken at lines B-B.

FIG. 4a shows a partially transparent top view of another example of a furnace assembly 1 with flat bath operation. The exemplified furnace assembly 1-3 is continuously fed with metallic material from the side via a conveyer belt 4, and it is also charged from the top via a shaft 15 arranged above the electric arc furnace 3. Feeding may be provided alternatingly by means of the conveyor belt and the shaft, or simultaneously. In this example, the electric arc furnace has a spout for tapping the melt, but could alternative be provided with a tapping hole.

The electromagnetic stirrer 5 may also in this case be configured to be oriented within 0° and 90° relative to the central plane 7 shown in FIG. 1. FIG. 4b shows the furnace assembly 1-3 through the cross-section taken at lines C-C.

FIG. 5a shows a partially transparent top view of another example of a furnace assembly 1 with flat bath operation. The exemplified furnace assembly 1-4 is continuously fed with metallic material from above the electric arc furnace 3 by means of a conveyor belt or a runner. The roof of the electric arc furnace 3 is provided with a through-opening 16, i.e. a feeding hole, for example the "5th hole", for feeding metallic material into the electric arc furnace 3 by means of the conveyor belt or the runner. The metallic material may for example comprise or be direct reduced iron.

The electromagnetic stirrer 5 may like previously having been described, be able to be oriented within 0° and 90° relative to the central plane 7 shown in FIG. 1. FIG. 5b shows the furnace assembly 1-3 through the cross-section taken at lines D-D.

The metallic material used for continuous feeding may for example be scrap, ferroalloys, direct reduced iron, hot briquetted iron, pig iron, hot metal, or mixing of metallic materials and oxides.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A furnace assembly for a metal-making process, comprising:
    an electric arc furnace configured for flat bath operation and having a bottom, and
    an electromagnetic stirrer configured to be arranged underneath the bottom of the electric arc furnace to enable stirring of molten metal in the electric arc furnace,
    wherein a metal-charging region is located off-center with respect to a center point of the bottom of the electric arc furnace, and
    wherein the electromagnetic stirrer includes coils configured to generate a traveling magnetic field in a first direction along a stirring direction axis when fed with a respective AC current, wherein the electromagnetic stirrer is configured to be arranged relative to a central plane extending through the center of the electric arc furnace and through a tapping hole or spout of the electric arc furnace so that the stirring direction axis is at an angle relative to the central plane, wherein the stirring direction axis intersects the central plane.

2. The furnace assembly as claimed in claim 1, wherein the angle is 90°.

3. The furnace assembly as claimed in claim 1, wherein the angle is greater than 0° and less than 90°.

4. The furnace assembly as claimed in claim 1, wherein the electromagnetic stirrer is arranged centered underneath the electric arc furnace.

5. The furnace assembly as claimed in claim 1, wherein the electromagnetic stirrer is arranged off-center underneath the electric arc furnace.

6. The furnace assembly as claimed in claim 1, comprising an electromagnetic stirrer position controller configured to control an orientation of the electromagnetic stirrer relative to the electric arc furnace to thereby adjust the angle.

7. The furnace assembly as claimed in claim 1, comprising a frequency converter configured to control the current in the electromagnetic stirrer, and a control system configured to control the frequency converter.

8. The furnace assembly as claimed in claim 1, wherein the electric arc furnace is configured to receive charging of metallic material from a side of the electric arc furnace.

9. The furnace assembly as claimed in claim 1, wherein the electric arc furnace is configured to receive charging of metallic material from above the electric arc furnace.

10. The furnace assembly as claimed in claim 8, wherein the electric arc furnace is configured to receive continuous charging of the metallic material.

11. The furnace assembly as claimed in claim 8, wherein the electric arc furnace is configured to receive bucket charging of the metallic material through a shaft.

12. The furnace assembly as claimed in claim 1, wherein the bottom of the electric arc furnace comprises a non-magnetic window, beneath which the electromagnetic stirrer is configured to be arranged.

13. The furnace assembly as claimed in claim 12, wherein the non-magnetic window comprises a non-magnetic metallic material.

14. The furnace assembly as claimed in claim 6, wherein the electromagnetic stirrer position controller is configured to adjust the angle based on an instantaneous amount of global stirring of a melt necessary.

15. The furnace assembly as claimed in claim 14, wherein the electromagnetic stirrer position controller is configured to adjust the angle based on a need for vortex reduction above the tapping hole.

16. The furnace assembly as claimed in claim 1, wherein a stirring force created by the electromagnetic stirrer is directed towards a cold zone formed by the metal-charging region.

17. The furnace assembly as claimed in claim 1, wherein the tapping hole is arranged off-center with respect to the center point of the bottom of the electric arc furnace.

18. The furnace assembly as claimed in claim 1, wherein the coils are connected to a respective electric phase of an AC current supply.

19. The furnace assembly as claimed in claim 1, wherein the electromagnetic stirrer is fed with a poly-phase AC current.

\* \* \* \* \*